(12) United States Patent
Chuang et al.

(10) Patent No.: US 8,467,630 B2
(45) Date of Patent: Jun. 18, 2013

(54) IMAGE PROCESSING DEVICE AND PROCESSING METHOD FOR GENERATING A SUPER-RESOLUTION IMAGE

(75) Inventors: Che-Lun Chuang, Hsinchu (TW); Chung-Ta Wu, Taichung (TW); Hong-Long Chou, Taipei (TW)

(73) Assignee: Altek Corporation, Hsinchu (TW)

( * ) Notice: Subject to any disclaimer, the term of this patent is extended or adjusted under 35 U.S.C. 154(b) by 94 days.

(21) Appl. No.: 13/195,851

(22) Filed: Aug. 2, 2011

(65) Prior Publication Data
US 2012/0288215 A1 Nov. 15, 2012

(30) Foreign Application Priority Data
May 13, 2011 (TW) .............................. 100116871 A

(51) Int. Cl.
*G06K 9/32* (2006.01)
*G06K 9/40* (2006.01)

(52) U.S. Cl.
USPC ............................ 382/299; 382/300; 382/275

(58) Field of Classification Search
USPC ................. 382/154, 199, 275, 285, 298–300, 382/305; 345/419–427, 700
See application file for complete search history.

(56) References Cited

U.S. PATENT DOCUMENTS

| | | | | |
|---|---|---|---|---|
| 7,477,802 B2 * | 1/2009 | Milanfar et al. | ............... | 382/299 |
| 8,023,754 B2 * | 9/2011 | Suzuki et al. | ................. | 382/236 |
| 8,107,765 B2 * | 1/2012 | Hwang et al. | ................. | 382/275 |
| 2006/0126952 A1 * | 6/2006 | Suzuki et al. | ................. | 382/233 |
| 2007/0019887 A1 * | 1/2007 | Nestares et al. | ............... | 382/299 |
| 2009/0046944 A1 * | 2/2009 | Bilcu et al. | ..................... | 382/274 |
| 2009/0116763 A1 * | 5/2009 | Hwang et al. | ................. | 382/266 |
| 2009/0274386 A1 * | 11/2009 | Panetta et al. | ................. | 382/266 |
| 2010/0054338 A1 * | 3/2010 | Suzuki et al. | ............. | 375/240.16 |
| 2010/0119176 A1 * | 5/2010 | Ichihashi et al. | .............. | 382/300 |
| 2010/0123792 A1 * | 5/2010 | Nagumo et al. | ........... | 348/222.1 |

OTHER PUBLICATIONS

Callico et al, Analysis of fast block matching motion estimation algorithms for video super-resolution systems, IEEE Transactions on Consumer Electronics, vol. 54, No. 3, Aug. 2008.*
Le et al, A Superresolution Imaging Method based on Dense subpixel—Accurate Motion Fields, International Workshop on Digital Computational Video Nov. 2002.*
Fedak, V.; Veres, Z.; Nakonechny, A.; , "Image and video super-resolution via accurate motion estimation," Perspective Technologies and Methods in MEMS Design (MEMSTECH), 2010 Proceedings of VIth International Conference on, vol., no., pp. 223-225, Apr. 20-23, 2010.*

* cited by examiner

*Primary Examiner* — Andrae S Allison
(74) *Attorney, Agent, or Firm* — Jianq Chyun IP Office

(57) ABSTRACT

An image processing device and the processing method thereof are provided. The device includes an image correcting module, an object-motion detection module and an image blending module. The image correcting module estimates a plurality of local motions of the non-selected images relative to the target image and a plurality of global motions, and performs a plurality of motion corrections to generate a plurality of corrected images. The object-motion detection module judges whether or not the difference between each of the local motions and the corresponding global motion is greater than a threshold value to generate a plurality of object-motion indicators. The image blending module performs an arithmetic operation on each pixel of the target image and each pixel of the corrected images according to the object-motion indicators so as to generate a super-resolution image.

18 Claims, 5 Drawing Sheets

IMAGE PROCESSING DEVICE AND PROCESSING METHOD FOR GENERATING A SUPER-RESOLUTION IMAGE

CROSS-REFERENCE TO RELATED APPLICATION

This application claims the priority benefit of Taiwan application serial no. 100116871, filed on May 13, 2011. The entirety of the above-mentioned patent application is hereby incorporated by reference herein and made a part of this specification.

BACKGROUND OF THE INVENTION

1. Field of the Invention

The invention generally relates to an image processing device and an image processing method thereof, and more particularly, to an image processing device and an image processing method thereof related to super-resolution image enlargement.

2. Description of Related Art

Image enlargement technique is an important research direction in image processing field, in which image interpolation is a method related to the image enlargement technique. In general speaking, an image interpolation is completed only on a single image, and the common method of enlarging a single image includes polynomial interpolation scheme, edge-directed interpolation scheme and example-based for super-resolution scheme.

Although polynomial interpolation scheme is simple and has fast operation speed, but it often makes enlarged images blurry due to lacking image high-frequency information, and a block effect is also produced. Edge-directed interpolation scheme or example-based for super-resolution scheme require massive computation. In short, for the image enlargement completed by enlarging a single image, the image quality is largely limited.

On the other hand, if the image enlargement is produced by blending a plurality of images, ghost phenomena are the most common side-effect. The ghost phenomena are produced due to that when a same scene is continuously shot, an individual object in the scene may be moving. However, during blending the captured images, the images are corrected based on their whole shifts (or camera shifts) without correcting the individual moving object in the scene, so that an individual moving object would result in ghost phenomena in the blended image.

SUMMARY OF THE INVENTION

Accordingly, the invention is directed to an image processing device able to enlarge a plurality of low-resolution images to generate high-resolution images, followed by detecting whether or not an individual object in the images has motion and then blending a plurality of corrected images so as to output a super-resolution image.

The invention also provides an image processing method able to process a plurality of high-resolution images generated by enlarging a plurality of low-resolution images and blend a plurality of corrected images so as to generate a super-resolution image.

The invention provides an image processing device for receiving a plurality of second-resolution images generated by enlarging a plurality of first-resolution images, in which one of the second-resolution images is a target image and the rest second-resolution images are a plurality of non-selected images. The image processing device includes an image correcting module, an object-motion detection module and an image blending module. The image correcting module estimates a plurality of local motions and a plurality of global motions of the non-selected images relative to the target image, and performs a plurality of motion corrections on the non-selected images so as to generate a plurality of corrected images. The object-motion detection module is coupled to the image correcting module and judges whether or not the difference between each of the local motions and the corresponding global motion is greater than a threshold value so as to generate a plurality of object-motion indicators. The image blending module is coupled to the object-motion detection module and performs an arithmetic operation on each pixel of the target image and each pixel of the corrected images according to the object-motion indicators so as to generate a third-resolution image, in which the resolution of the third-resolution image is higher than the resolution of the second-resolution images.

In an embodiment of the present invention, the above-mentioned image blending module sets a plurality of weights according to the object-motion indicators, and the arithmetic operation is that the image blending module uses the weights to perform weighting sum operation on every pixel of the target image and every pixel of the corrected images.

In an embodiment of the present invention, the above-mentioned image blending module performs a plurality of directional gradient operations on each pixel of the target image and each pixel of the corrected images so as to generate a plurality of gradient differences.

In an embodiment of the present invention, when the difference between each local motion and the corresponding global motion is greater than the threshold value, the object-motion detection module enables the object-motion indicators; when the difference between each local motion and the corresponding global motion is not greater than the threshold value, the object-motion detection module disables the object-motion indicators.

In an embodiment of the present invention, when the object-motion indicator is enabled, the image blending module sets the weight with zero; when the object-motion indicator is disabled, the image blending module sets the weight with the gradient differences.

In an embodiment of the present invention, the above-mentioned image blending module performs the directional gradient operations on each pixel of the target image and each pixel of the corrected images so as to generate a plurality of directional gradient values, and the directional gradient values include a horizontal directional gradient value, a vertical directional gradient value and two diagonal directional gradient values.

In an embodiment of the present invention, the above-mentioned image blending module further selects the maximal one among the directional gradient values as a maximum gradient value and selects the minimal one among the directional gradient values as a minimum gradient value on each pixel of the target image and each point of the corrected images, and each of the gradient differences is equal to the difference between the maximum gradient value and the minimum gradient value.

In an embodiment of the present invention, the above-mentioned image correcting module includes a local motion estimation unit and a global motion estimation unit. The local motion estimation unit respectively divides the target image and the non-selected images into a plurality of blocks and estimates the local motions of the non-selected images relative to the target image. The global motion estimation unit is coupled to the local motion estimation unit and performs a plurality of global motion estimations according to the local motions so as to generate the global motions.

In an embodiment of the present invention, the above-mentioned image correcting module includes a motion correcting unit to perform the motion corrections by using an affine transformation matrix so that the positions of the start points of the non-selected images are corrected to be the same as the position of the start point of the target image.

The invention also provides an image processing method for processing a plurality of second-resolution images generated by enlarging a plurality of first-resolution images, in which one of the second-resolution images is a target image and the rest second-resolution images are a plurality of non-selected images. The image processing method includes following steps: estimating a plurality of local motions and a plurality of global motions of the non-selected images relative to the target image; performing a plurality motion corrections on the non-selected images so as to generate a plurality of corrected images; judging whether or not the difference between each of the local motions and the corresponding global motion is greater than a threshold value so as to generate a plurality of object-motion indicators; performing an arithmetic operation on each pixel of the target image and each pixel of the corrected images according to the object-motion indicators so as to generate a third-resolution image, in which the resolution of the third-resolution image is higher than the resolution of the second-resolution images.

Based on the depiction above, the invention is able to enlarge a single or a plurality of low-resolution images so as to generate a plurality of high-resolution images, followed by blending a plurality of images to produce a super-resolution image with high quality and abundant detail information. In addition, prior to blending the images, the invention also judges whether or not an individual object in the images has motion, and thus the super-resolution image generated after the blending is avoided to produce ghost phenomena.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
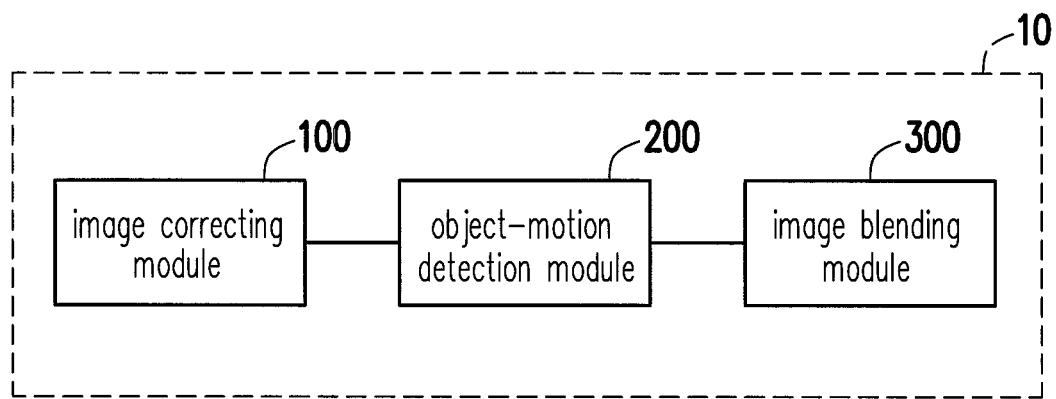
FIG. 1 is a block diagram of an image processing device according to an embodiment of the invention.

FIG. 1 is a block diagram of an image processing device according to an embodiment of the invention. Referring to FIG. 1, an image processing device 10 is for receiving a plurality of second-resolution images generated by enlarging a plurality of first-resolution images, in which the first-resolution images can be captured by a digital image capturing device with a CMOS sensor, such as digital camera or digital video (DV) camera. The CMOS sensor features continuous shooting with high speed, and thus the image capturing device with a CMOS sensor is able to shoot a plurality of first-resolution images on a scene. In addition, people skilled in the art can adopt a common method of enlarging an image to enlarge a plurality of first-resolution images so as to generate a plurality of second-resolution images. The method of enlarging an image includes polynomial interpolation scheme, edge-directed interpolation scheme and example-based for super-resolution scheme, and the like. One of the above-mentioned second-resolution images is selected as a target image and the rest second-resolution images are a plurality of non-selected images.

The image processing device 10 includes an image correcting module 100, an object-motion detection module 200 and an image blending module 300. It should be noted that the first-resolution images are obtained by continuously shooting a scene. When hands hold the image processing device 10 during shooting, the hand shaking phenomena would produce sub-pixel shifts between the first-resolution images. At the time, the image correcting module 100 estimates a plurality of local motions of the non-selected images relative to the target image, and a plurality of global motions of every non-selected image relative to the target image can be determined according to the local motions. Then, the image correcting module 100 performs a plurality motion corrections on the non-selected images according to the global motions so as to generate a plurality of corrected images.

The object-motion detection module 200 is coupled to the image correcting module 100 and judges whether or not the difference between each of the local motions and the corresponding global motion is greater than a threshold value so as to generate a plurality of object-motion indicators, in which the threshold value can be predetermined depending on the application need, which the invention is not limited to. After that, the image blending module 300 coupled to the object-motion detection module 200 performs an arithmetic operation on each pixel of the target image and each pixel of the corrected images according to the object-motion indicators so as to generate a third-resolution image, in which the resolution of the third-resolution image is higher than the resolution of the second-resolution images.

In more details, when the difference between each local motion and the corresponding global motion is greater than the threshold value, the object-motion detection module 200 enables the generated object-motion indicators, in which the enabled object-motion indicator represents the presence of object motion in the block. The object-motion detection module 200 instructs the image blending module 300 not to blend the image of the block by using the enabled object-motion indicator. On the contrary, when the difference between each local motion and the corresponding global motion is not greater than the threshold value, the object-motion detection module 200 disables the generated object-motion indicators, which represents no object motion in the block and the image of the block should be joined to be blended. In this way, the ghost phenomena on an image in the prior art can be effectively solved.

In order to further explain the operation details of the image processing device 10 and better understand the invention, another embodiment as an exemplary implementation of the invention is depicted in follows.

Figure 2:
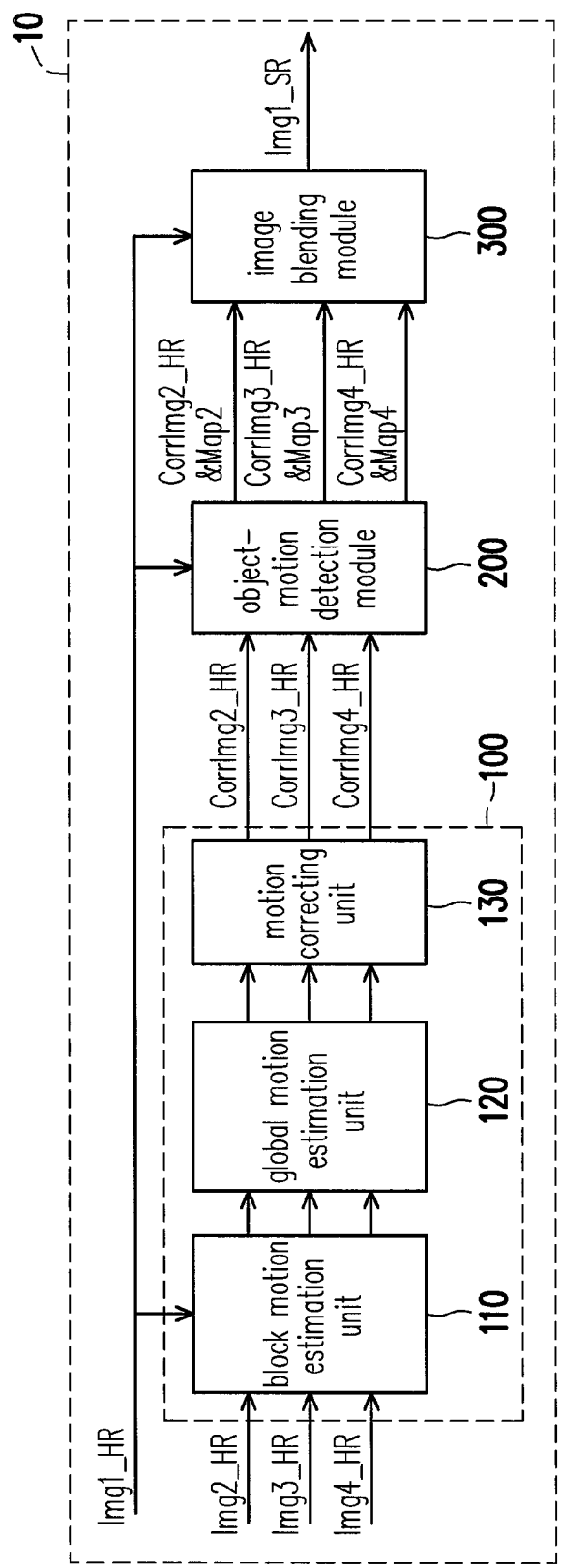
FIG. 2 is a block diagram of an image processing device according to another embodiment of the invention.

FIG. 2 is a block diagram of an image processing device according to another embodiment of the invention. Referring to FIG. 2, the image correcting module 100 of the image processing device 10 includes a local motion estimation unit 110, a global motion estimation unit 120 and a motion correcting unit 130. First, the local motion estimation unit 110 receives four second-resolution (in the embodiment, it is high-resolution) images Img1_HR, Img2_HR, Img3_HR and Img4_HR generated by enlarging four first-resolution (in the embodiment, it is low-resolution) images Img1_LR, Img2_LR, Img3_LR and Img4_LR. In the embodiment, the quantity of the received images is set four as an example only, which the invention is not limited to.

The local motion estimation unit 110 respectively divides in a same way the target image Img1_HR and the non-selected images Img2_HR, Img3_HR and Img4_HR into a plurality of blocks. For example, if the size of the target image and the non-selected images is P×Q, the target image and the non-selected images can be divided into M×N blocks, in which M, N, P and Q are respectively an integer number greater than 1, M is less than or equal to P and N is less than or equal to Q, and the dividing method can be determined depending on the application need, which the invention is not limited to. Then, the local motion estimation unit 110 respectively estimates a plurality of local motions of each block of the non-selected images Img2_HR, Img3_HR and Img4_HR relative to the corresponding block of the target image Img1_HR, in which the estimation method is, for example, to compare the blocks with one another, and the like.

The global motion estimation unit 120 performs a plurality of global motion estimations respectively on each of the non-selected images Img2_HR, Img3_HR and Img4_HR. For example, each of the global motion estimations can be performed by taking a mode from all the local motions of the corresponding non-selected image; i.e., after making statistics on the local motions of a non-selected image, the local motion with the highest happening count serves as the global motion value, or the mean of all the local motions of a non-selected image serves as the global motion value, and the like. As a result, each of the non-selected images Img2_HR, Img3_HR and Img4_HR has a global motion thereof.

The motion correcting unit 130 performs motion corrections according to the above-mentioned global motions, in which the motion corrections are performed by using an affine transformation matrix so that the positions of the start points of the non-selected images Img2_HR, Img3_HR and Img4_HR are corrected to be the same as the position of the start point of the target image Img1_HR. The affine transformation matrix can be used to get a rotated correction and a translated correction, in which the coefficients of the matrix can be obtained by the global motion values. Following the above-mentioned method, the corrected images CorrImg2_HR, CorrImg3_HR and CorrImg4_HR are obtained.

Figure 3:
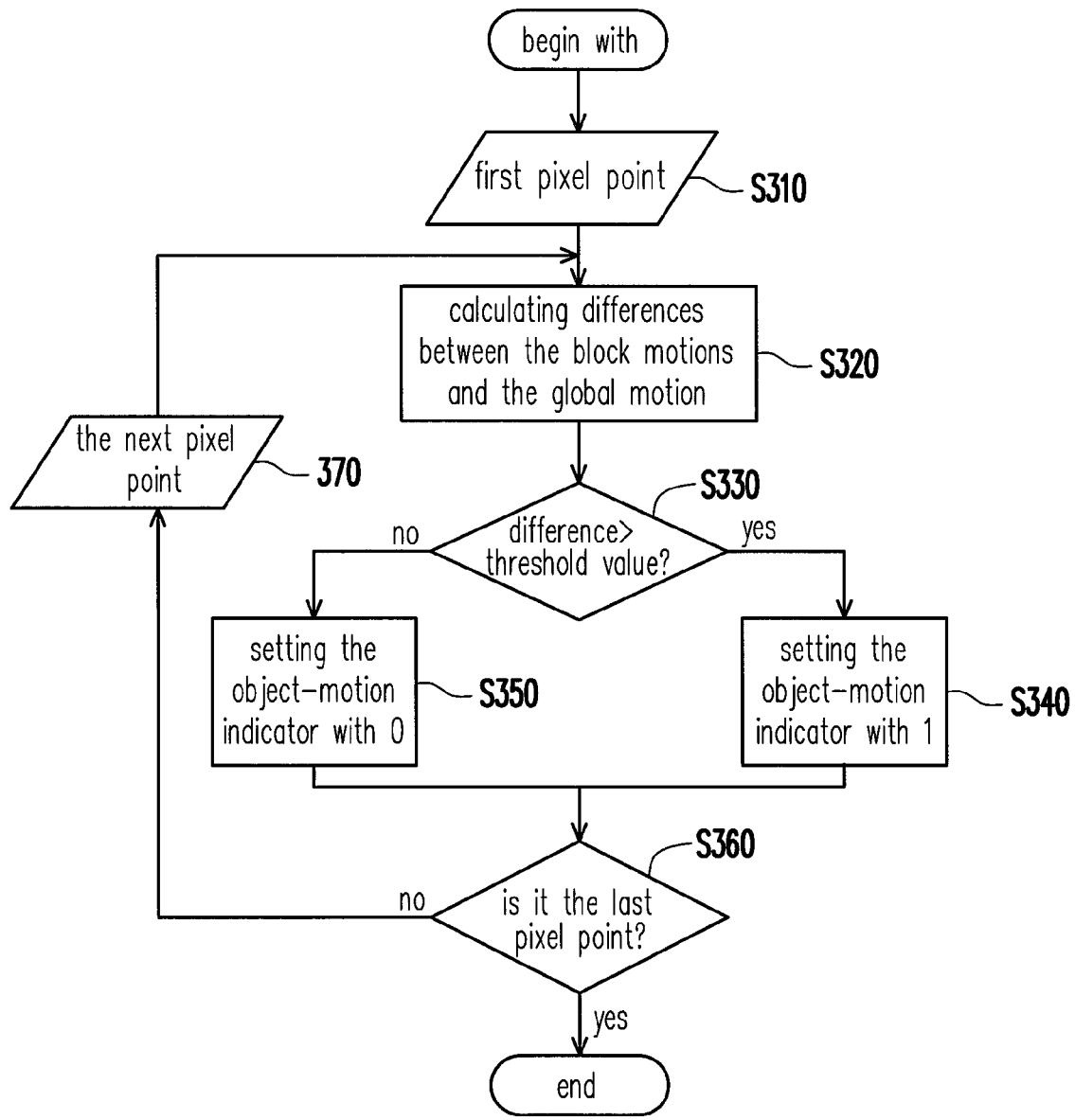
FIG. 3 is a flowchart of an object motion detection method performed by the object-motion detection module 200 of the embodiment of the invention.

The object-motion detection module 200 respectively performs object-motion detections on each of the corrected images CorrImg2_HR, CorrImg3_HR and CorrImg4_HR and the target image Img1_HR so as to generate a plurality of object-motion indicators Map2, Map3 and Map4. FIG. 3 is a flowchart of an object motion detection method performed by the object-motion detection module 200 of the embodiment of the invention. Referring to FIGS. 2 and 3, in step S310, the object-motion detection is performed starting from the first pixel of an image. Since the local motions and the global motions can be obtained by the local motion estimation unit 110 and the global motion estimation unit 120, so that, in step S320, differences $Diff_i$ between the local motions and the global motion can be calculated as follows:

$$Diff_i = |X\_LM_i - X\_GM| + |Y\_LM_i - Y\_GM|$$

in which $X\_LM_i$ and $Y\_LM_i$ respectively represent a horizontal component and a vertical component of a local motion, i represents the i-th block of the image which the pixel belongs to, i is a positive integer number greater than zero, and $X\_GM$ and $Y\_GM$ represent a horizontal component and a vertical component of the global motion value of the image.

After that, in step S330, it is judged whether or not the difference $Diff_i$ is larger than the threshold value TH, in which the threshold value TH can be set by people skilled in the art according to the application need. If the difference $Diff_i$ is greater than the threshold value TH, the operation goes to step S340, where the object-motion detection module 200 enables the object-motion indicator (for example, setting the object-motion indicator with 1) and the enabled object-motion indicator represents the presence of object motion with the block. If the difference $Diff_i$ is not greater than the threshold value TH, the operation goes to step S350, where the object-motion detection module 200 disables the object-motion indicator (for example, setting the object-motion indicator with 0) and the disabled object-motion indicator represents no object motion with the block. Every pixel in an image needs to be judged in the operation flow. In step S360, whether or not the last pixel in the image has been judged. If the last pixel has been judged, the operation of the object-motion detections is ended; if the last pixel has not been judged, the flow goes to the next pixel for calculation and judgement.

The image blending module 300 blends each pixel in the target image with each corresponding pixel in the corrected images CorrImg2_HR, CorrImg3_HR and CorrImg4_HR. During the blending, the third-resolution image Img1_SR is generated (in the embodiment, it is, for example, super-resolution), in which the object-motion indicators Map2, Map3 and Map4 must be considered. For example, the first pixel of the super-resolution image Img1_SR is generated by blending the first pixel of the target image Img1_HR with the first pixels of the corrected images CorrImg2_HR, CorrImg3_HR and CorrImg4_HR.

Figure 4:
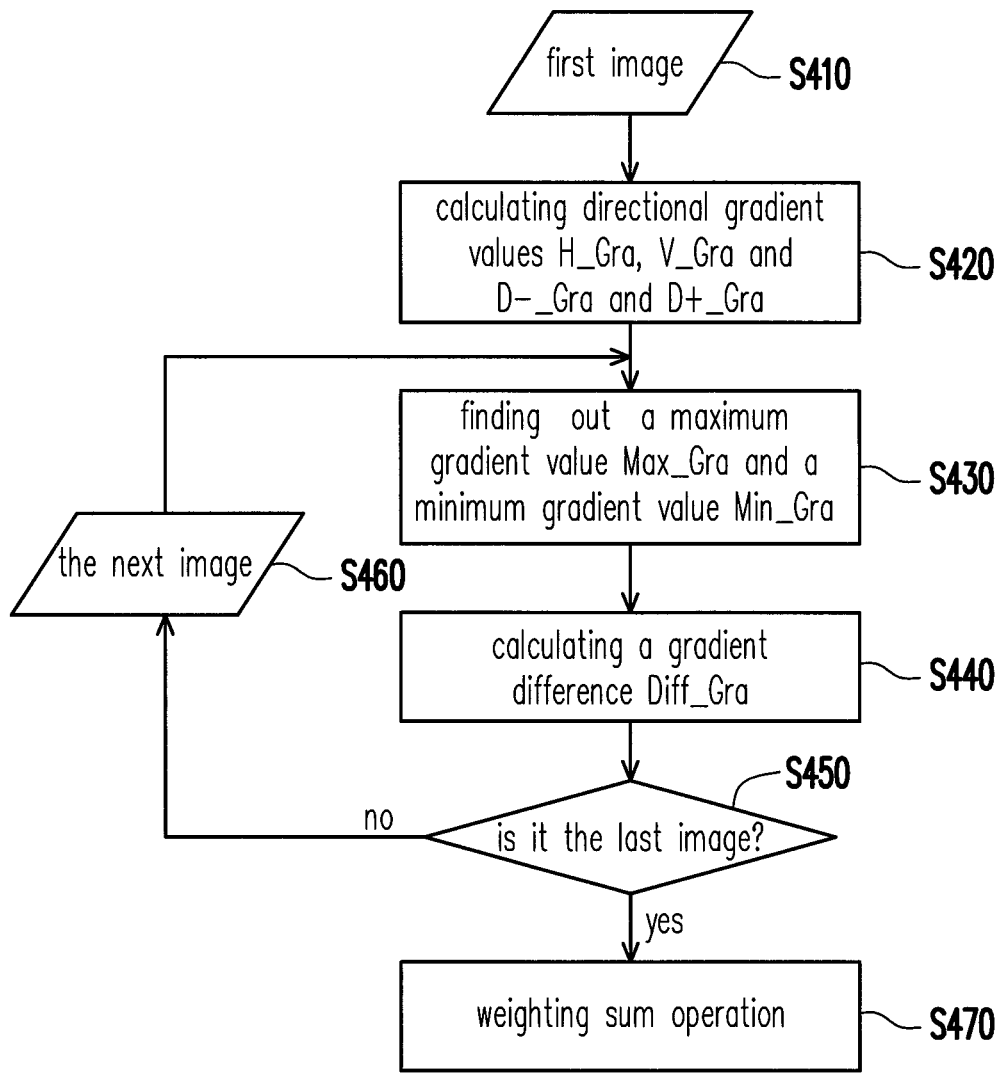
FIG. 4 is a flowchart of image blending method against one of the pixels performed by the image blending module 300 of the embodiment of the invention.

The details of the blending method can be described referring to FIGS. 2 and 4, in which FIG. 4 is a flowchart of image blending method against a single pixel performed by the image blending module 300 in the embodiment of the invention.

In step S410, the operation flow begins with the first image (for example, begins with the target image Img1_HR). Next in step S420, the image blending module 300 performs directional gradient operation to generate directional gradient values on the above-mentioned pixel, in which the directional gradient values includes a horizontal directional gradient value H_Gra, a vertical directional gradient value V_Gra and two diagonal directional gradient values D−_Gra and D+_Gra. The horizontal directional gradient value H_Gra is the sum of absolute values of the two graylevel differences between the above-mentioned pixel and two pixels horizontally adjacent to the above-mentioned pixel. The vertical directional gradient value V_Gra is the sum of absolute values of the two graylevel differences between the above-mentioned pixel and two pixels vertically adjacent to the above-mentioned pixel. The diagonal directional gradient values D−_Gra and D+_Gra respectively are the sum of absolute values of the two graylevel differences between the above-mentioned pixel and two pixels diagonally adjacent to the above-mentioned pixel, in which 'diagonally' means along a first diagonal direction and a second diagonal direction.

Then in step S430, the image blending module 300 further selects a maximal one and a minimal one among the above-mentioned four directional gradient values as a maximum gradient value Max_Gra and a minimum gradient value Min_Gra. In step S440, a gradient difference Diff_Gra between the maximum gradient value Max_Gra and the minimum gradient value Min_Gra is calculated.

In step S450, the operation judges whether or not the processed image is the last image. If it is not the last image, the operation goes to step S460 for processing the next image until the gradient difference Diff_Gra of every image to be blended is calculated out. After that, the operation goes to step S470. In order to avoid ghost phenomena, the image blending module 300 must take the object-motion indicators Map2, Map3 and Map4 as an important factor. When the object-motion indicators Map2, Map3 and Map4 for the pixel are 1, it indicates the presence of object motion, and thus, the weight W is set with 0 so that the pixel is not chosen for image blending. On the contrary, when the object-motion indicators Map2, Map3 and Map4 for the pixel are 0, the image blending module 300 sets the weight with the gradient difference Diff_Gra of the pixel. A larger gradient difference Diff_Gra indicates there is texture or edge with the pixel in the image, thus, the image information of the pixel is more important to be preserved and accordingly the gradient difference Diff_Gra is used as the weight of the pixel. In step S470, the image blending module 300 uses the above-mentioned settings to perform weighting sum operation on every pixel of every image, in which the final value FV of the weighting sum operation of a pixel is calculated with:

$$FV = \frac{\sum_{n=1}(\text{Weight}[n] \times img[n])}{\sum_{n=1} \text{Weight}[n]}$$

in which n represents the n-th image, Weight[n] represents the weight of a pixel in the n-th image and img[n] represents the graylevel value of the above-mentioned pixel in the n-th image. The image blending is performed on every pixel in the target image Img1_HR and the corrected images CorrImg2_HR, CorrImg3_HR and CorrImg4_HR, followed by outputting the super-resolution image Img1_SR.

Figure 5:
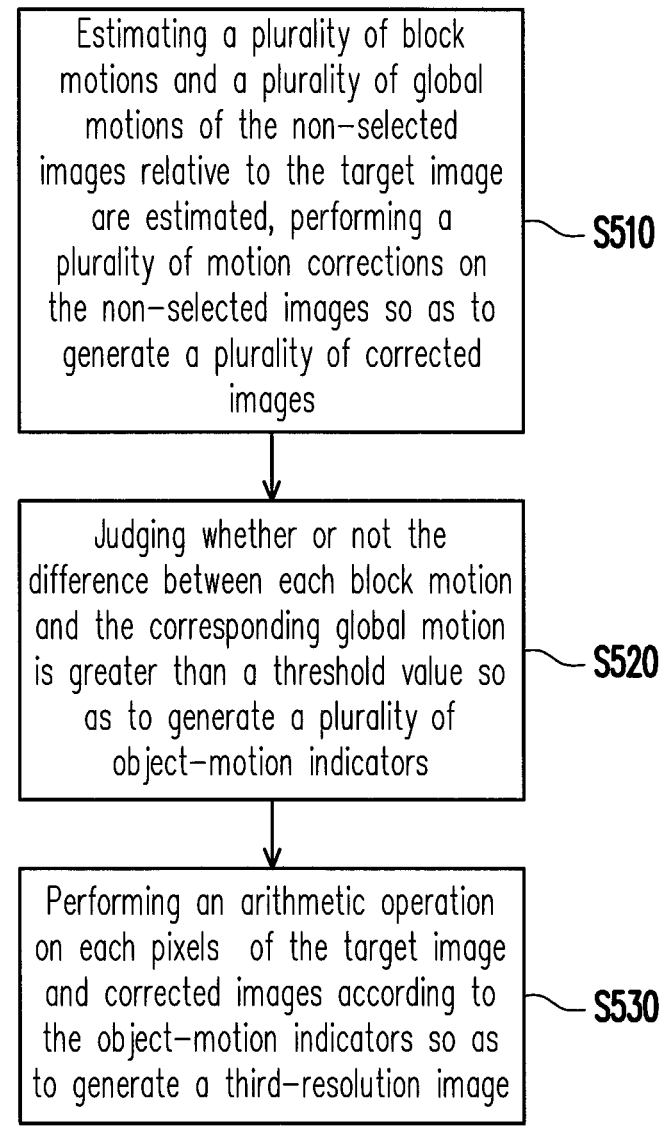
FIG. 5 is a flowchart of an image processing method according to an embodiment of the invention.

FIG. 5 is a flowchart of an image processing method according to an embodiment of the invention. The method is for processing a plurality of second-resolution images generated by enlarging a plurality of first-resolution images, in which one of the second-resolution images is a target image and the rest second-resolution images are a plurality of non-selected images. Referring to FIG. 5, in step S510, a plurality of local motions and a plurality of global motions of the non-selected images relative to the target image are estimated. Then, a plurality of motion corrections on the non-selected images are performed so as to generate a plurality of corrected images. In step S520, it is judged whether or not the difference between each local motion and the corresponding global motion is greater than a threshold value so as to generate a plurality of object-motion indicators. In step S530, an arithmetic operation on each of the pixels of the target image and corrected images is performed according to the object-motion indicators so as to generate a third-resolution image, in which the resolution of the third-resolution image is higher than the resolution of the second-resolution images.

In summary, the invention is able to enlarge a single or a plurality of low-resolution images so as to generate a plurality of high-resolution images, followed by blending the high-resolution images to produce a super-resolution image with high quality and abundant detail information. In addition, prior to blending the images, the invention also judges whether or not an individual object in the images has motion. If there is motion of an individual object in an image, for the image area with the presence of motion, only a single image is selected to be enlarged without joining for image blending. In this way, the ghost phenomena problem easily produced by blending a plurality of images can be avoided. For the rest image areas to be blended, the gradient differences are used as the weights thereof, which can make the super-resolution image generated after the blending keep image sharpness and meanwhile eliminate the block effect and reduce noise.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. An image processing device, for receiving a plurality of second-resolution images generated by enlarging a plurality of first-resolution images, wherein one of the second-resolution images is a target image and the rest second-resolution images are a plurality of non-selected images; the image processing device comprising:
   an image sensor; and
   a processor, comprising:
      an image correcting module, estimating a plurality of local motions and a plurality of global motions of the non-selected images relative to the target image, and performing a plurality of motion corrections on the non-selected images so as to generate a plurality of corrected images;
      an object-motion detection module, coupled to the image correcting module, and judging whether or not the difference between each of the local motions and the corresponding global motion is greater than a threshold value so as to generate a plurality of object-motion indicators; and
      an image blending module, coupled to the object-motion detection module, and performing an arithmetic operation on each pixel of the target image and each pixel of the corrected images according to the object-motion indicators so as to generate a third-resolution image, wherein the resolution of the third-resolution image is higher than the resolution of the second-resolution images.

2. The image processing device as claimed in claim 1, wherein the image blending module sets a plurality of weights according to the object-motion indicators, and the arithmetic operation is that the image blending module uses the weights to perform weighting sum operation on every pixel of the target image and every pixel of the corrected images.

3. The image processing device as claimed in claim 2, wherein the image blending module performs a plurality of directional gradient operations on each pixel of the target image and each pixel of the corrected images so as to generate a plurality of gradient differences.

4. The image processing device as claimed in claim 3, wherein the object-motion detection module enables the object-motion indicators, when the difference between each local motion and the corresponding global motion is greater than the threshold value, wherein the object-motion detection module disables the object-motion indicators, when the difference between each local motion and the corresponding global motion is not greater than the threshold value.

5. The image processing device as claimed in claim 4, wherein the image blending module sets the weights with zero, when the object-motion indicators are enabled, wherein the image blending module sets the weights with the gradient differences, when the object-motion indicators are disabled.

6. The image processing device as claimed in claim 3, wherein the image blending module performs the directional gradient operations on each pixel of the target image and each pixel of the corrected images so as to generate a plurality of directional gradient values, and the directional gradient values comprise a horizontal directional gradient value, a vertical directional gradient value and two diagonal directional gradient values.

7. The image processing device as claimed in claim 6, wherein the image blending module further selects the maximal one among the directional gradient values as a maximum gradient value and selects the minimal one among the directional gradient values as a minimum gradient value on each pixel of the target image and each point of the corrected images, and each of the gradient differences is equal to the difference between the maximum gradient value and the minimum gradient value.

8. The image processing device as claimed in claim 1, wherein the image correcting module comprises:
   a local motion estimation unit, respectively dividing the target image and the non-selected images into a plurality of blocks and estimating the local motions of the non-selected images relative to the target image; and
   a global motion estimation unit, coupled to the local motion estimation unit and performing a plurality of global motion estimations according to the local motions so as to generate the global motions.

9. The image processing device as claimed in claim 1, wherein the image correcting module comprises:
   a motion correcting unit, performing the motion corrections by using an affine transformation matrix so that the positions of the start points of the non-selected images are corrected to be the same as the position of the start point of the target image.

10. An image processing method, for processing a plurality of second-resolution images generated by enlarging a plurality of first-resolution images, wherein one of the second-resolution images is a target image and the rest second-resolution images are a plurality of non-selected images; the image processing method comprising:
   estimating a plurality of local motions and a plurality of global motions of the non-selected images relative to the target image, and performing a plurality of motion corrections on the non-selected images so as to generate a plurality of corrected images;
   judging whether or not the difference between each of the local motions and the corresponding global motion is greater than a threshold value so as to generate a plurality of object-motion indicators; and
   performing an arithmetic operation on each pixel of the target image and each pixel of the corrected images according to the object-motion indicators so as to generate a third-resolution image, wherein the resolution of the third-resolution image is higher than the resolution of the second-resolution images.

11. The image processing method as claimed in claim 10, wherein a plurality of weights on each pixel of the target image and each pixel of the corrected images are set according to the object-motion indicators, and the arithmetic operation is that using the weights to perform weighting sum operation.

12. The image processing method as claimed in claim 11, wherein a plurality of directional gradient operations on each pixel of the target image and each pixel of the corrected images are performed so as to generate a plurality of gradient differences.

13. The image processing method as claimed in claim 12, wherein the object-motion indicators are enabled, when the difference between each local motion and the corresponding global motion is greater than the threshold value, wherein the object-motion indicators are disabled, when the difference between each local motion and the corresponding global motion is not greater than the threshold value.

14. The image processing method as claimed in claim 13, wherein the weights are set with zero, when the object-motion indicators are enabled, wherein the weights are set with the gradient differences, when the object-motion indicators are disabled.

15. The image processing method as claimed in claim 12, wherein the directional gradient operations on each pixel of the target image and each pixel of the corrected images are performed so as to generate a plurality of directional gradient differences, and the directional gradient values comprise a horizontal directional gradient value, a vertical directional gradient value and two diagonal directional gradient values.

16. The image processing method as claimed in claim 15, wherein the step of performing the directional gradient operations on each pixel of the target image and each pixel of the corrected images so as to generate the directional gradient differences comprises:
   selecting the maximal one among the directional gradient values as a maximum gradient value;
   selecting the minimal one among the directional gradient values as a minimum gradient value; and
   subtracting the minimum gradient value from the maximum gradient value to obtain one of the gradient differences.

17. The image processing method as claimed in claim 10, wherein the step of estimating the local motions and the global motions of the non-selected images relative to the target image comprises:
   respectively dividing the target image and the non-selected images into a plurality of blocks;
   estimating the local motions of the non-selected images relative to the target image;
   performing a plurality of global motion estimations according to the local motions so as to generate the global motions.

18. The image processing method as claimed in claim 10, wherein the motion corrections are performed by using an affine transformation matrix so that the positions of the start points of the non-selected images are corrected to be the same as the position of the start point of the target image.

* * * * *